United States Patent [19]
Schuchman et al.

[11] Patent Number: 6,148,195
[45] Date of Patent: Nov. 14, 2000

[54] PHASE AGILE ANTENNA FOR USE IN POSITION DETERMINATION

[75] Inventors: Leonard Schuchman, Potomac, Md.; Lloyd Engelbrecht, The Sea Ranch, Calif.

[73] Assignee: ITT Manufacturing Enterprises, Inc., Wilmington, Del.

[21] Appl. No.: 09/025,093

[22] Filed: Feb. 17, 1998

Related U.S. Application Data

[60] Provisional application No. 60/038,838, Feb. 18, 1997.

[51] Int. Cl.[7] ................ H04Q 7/20; H04Q 7/30
[52] U.S. Cl. .......................................... 455/424
[58] Field of Search ................... 455/562, 456, 455/422, 457, 561, 424

[56] References Cited

U.S. PATENT DOCUMENTS

| | | | |
|---|---|---|---|
| 4,747,120 | 5/1988 | Foley | 379/38 |
| 4,843,377 | 6/1989 | Fuller et al. | 340/573 |
| 4,916,435 | 4/1990 | Fuller | 340/573 |
| 4,924,211 | 5/1990 | Davies | 340/573 |
| 4,999,613 | 3/1991 | Williamson et al. | 340/573 |
| 5,023,901 | 6/1991 | Sloan et al. | 379/38 |
| 5,146,207 | 9/1992 | Henry et al. | 340/573 |
| 5,189,395 | 2/1993 | Mitchell | 340/539 |
| 5,204,670 | 4/1993 | Stinton | 340/825.54 |
| 5,206,897 | 4/1993 | Goudreau et al. | 379/38 |
| 5,239,671 | 8/1993 | Linquist et al. | 455/13.1 |
| 5,255,183 | 10/1993 | Katz | 364/406 |
| 5,255,306 | 10/1993 | Melton et al. | 379/38 |
| 5,266,944 | 11/1993 | Carroll et al. | 340/825.36 |
| 5,341,397 | 8/1994 | Gudmundson | 375/1 |
| 5,355,529 | 10/1994 | Linquist et al. | 455/13.1 |
| 5,361,399 | 11/1994 | Linquist et al. | 455/56.1 |
| 5,363,425 | 11/1994 | Mufti et al. | 379/38 |
| 5,369,699 | 11/1994 | Page et al. | 379/38 |
| 5,377,183 | 12/1994 | Dent | 370/18 |
| 5,396,227 | 3/1995 | Carroll et al. | 340/825.31 |
| 5,423,056 | 6/1995 | Linquist et al. | 455/33.1 |
| 5,483,665 | 1/1996 | Linquist et al. | 455/13.1 |
| 5,517,690 | 5/1996 | Linquist et al. | 455/33.1 |
| 5,537,102 | 7/1996 | Pinnow | 340/825.3 |
| 5,548,813 | 8/1996 | Charas et al. | 455/562 |
| 5,548,814 | 8/1996 | Lorang et al. | 455/38.1 |
| 5,561,618 | 10/1996 | Dehesh | 364/725 |
| 5,570,412 | 10/1996 | LeBlanc | 379/58 |
| 5,583,517 | 12/1996 | Yokev et al. | 342/457 |

(List continued on next page.)

*Primary Examiner*—Daniel S. Hunter
*Assistant Examiner*—Myron K. Wyche
*Attorney, Agent, or Firm*—Jim Zegeer

[57] ABSTRACT

A cellular telephone communication system has at least one base station and a plurality of remote mobile stations in which both base and mobile stations have RF transceivers which communicate with each other using periodically repeated pulse sequence epochs whose time patterns are known at both transmitting and receiving station. Each mobile station transceiver, during normal operation, establishes and maintains synchronization between the start of a received pulse epoch at the mobile station and a subsequent beginning of a responsive transmitted pulse epoch. An agile antenna system is located at the base station and includes at least one scanning antenna spaced a selected distance from a central reference point. The scanning antenna is effectively rotated relative to the central reference point and adapted to receive RF transmissions from a selected mobile station, and a direction or bearing detection processor is connected to antenna systems for detecting from received RF transmissions from the selected mobile station the bearing to the selected mobile station from the base station. The bearing sensing processor is one selected from amplitude sensing, phase sensing or frequency sensing or a combination of these sensing principles. A range measuring processor circuit also at the base station measures the time interval from the start of the base station's transmitted pulse epoch to the start of a pulse epoch subsequently received from the selected mobile station and derives range to the selected mobile station therefrom.

7 Claims, 10 Drawing Sheets

U.S. PATENT DOCUMENTS

| | | | |
|---|---|---|---|
| 5,592,180 | 1/1997 | Yokev et al. | 342/450 |
| 5,614,890 | 3/1997 | Fox | 340/825.34 |
| 5,646,839 | 7/1997 | Katz | 379/93.01 |
| 5,661,458 | 8/1997 | Page et al. | 340/573 |
| 5,677,696 | 10/1997 | Silverstein et al. | 342/360 |
| 5,714,932 | 2/1998 | Castellon et al. | 340/539 |
| 5,724,666 | 3/1998 | Dent | 455/562 |
| 5,729,196 | 3/1998 | Aljadeff et al. | 340/505 |
| 5,745,037 | 4/1998 | Guthrie et al. | 340/573 |
| 5,764,188 | 6/1998 | Ghosh et al. | 455/422 |
| 5,859,612 | 1/1999 | Gilhousen | 342/449 |
| 5,945,948 | 8/1999 | Buford et al. | 342/457 |
| 5,945,949 | 8/1999 | Yun | 455/456 |

CONVERTING $\Delta_T$ $$Es = EoCOS\{\omega_c t - (2\pi L/\lambda)COS(\omega_0 t - \varnothing)\}$$

THIS TERM TELLS US WHERE THE SIGNAL SOURCE IS $$\omega_0 = 2\pi / T8$$

FIGURE 3

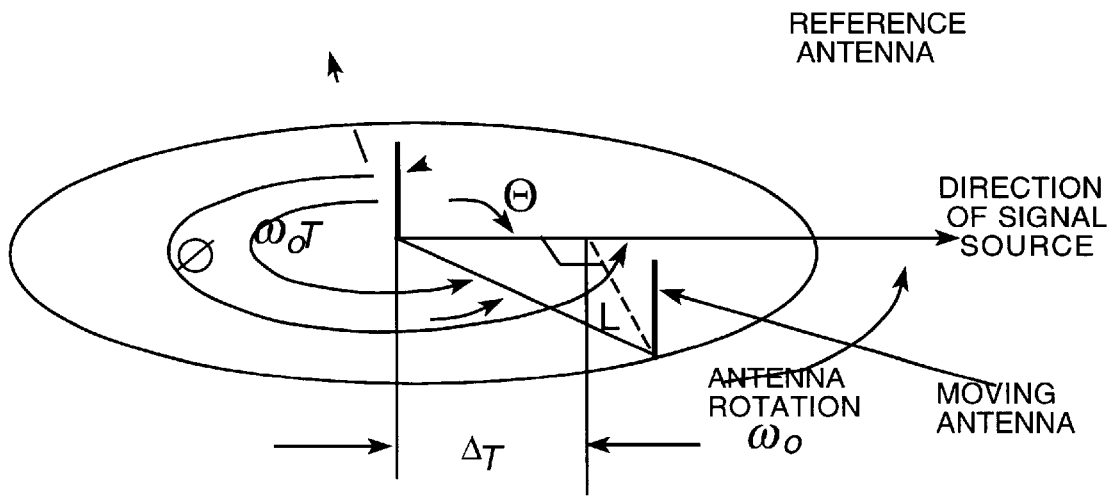

Signal at the Reference Antenna:

$$E_r = E_o \cos(\omega_c + f(\text{mod}, t)) \qquad (1)$$

where: $E_r$ = reference antenna signal
$E_o$ = Signal source
$\omega_c$ = carrier radian frequency
$f(\text{mod}, t)$ = information modulation function $$E_s = E_o \cos(\omega_c + f(\text{mod}, t) + (2\pi L/\lambda) \cos(\omega_o t - \varnothing) \qquad (2)$$

where: L = antenna spacing in same units as wavelength
$\lambda$ = wavelength
$\omega_o$ = antenna rotational velocity
$\Theta$ = angle between line of antennas and signal direction $$\omega_O = 2\pi / T8$$

PHASE AGILE ANTENNA FOR USE IN POSITION DETERMINATION

REFERENCE TO RELATED APPLICATION

This application is the subject of provisional application Serial No. 60/038,838 filed Feb. 18, 1997 and entitled A PHASE AGILE ANTENNA FOR USE IN DETERMINING THE DIRECTION OF A RADIO FREQUENCY SIGNAL.

Reference is also made to companion application Ser. No. 09/025,092 filed concurrently herewith and entitled POSITIONING SYSTEM FOR CDMA/PCS COMMUNICATIONS SYSTEM which is incorporated herein by reference.

BACKGROUND AND BRIEF DESCRIPTION OF THE INVENTION

This invention relates to a phase agile antenna for use in determining the direction of a radio frequency signal and ranging to achieve position determination.

In the prior art there are may methods for determining direction and range to a signal source. For example, in U.S. Pat. No. 4,339,755 to Wright, a pair of antennas spaced by a known distance apart utilizes receiver signals from a source, the antennas being arranged such that signals are received by one antenna before the other antenna due to different travel distances for the signal to each antenna. A triangulation system is then utilized to determine range to the source and direction to the source. In Zablotney et al U.S. Pat. No. 5,054,450, a similar system is used with a single antenna. Hipp et al U.S. Pat. No. 5,321,410 disclose a system in which an antenna array in a circle around a large through mast has direction capabilities enhanced where measurements of amplitude and relative phase shift show an induced distortion pattern through the mast. Analysis of the amplitude and phase measurements determine the angle of incidence of the incoming signal. In Murphy et al U.S. Pat. No. 5,541,608, a hybrid amplitude phase comparison direction-finding system for aircraft is disclosed. In that system, a calibration system utilizes the programmable read-only memory for each antenna pair where calibration and data from premeasured antenna patterns of their associated antennas are stored in their prom. A system processor retrieves the calibration data during system operation to arrive at the angle of measurements before the direction-finding aspects.

According to the present invention, a direction-finding system includes a referenced antenna and array of antenna positions around the reference antenna for receiving digital telephony radio signals at a base station from a mobile source. Phase frequency and amplitude detection of the relative phases of the radio signals received at the reference antenna and at each of the antenna positions in the circular array are used to derive the direction to the source relative to the reference antenna.

Range Determination

In conventional radars, range estimation ("ranging") is done by determining the time required for a pulsed signal to reach the "target" and subsequently for its echo to return to the radar receiver. This time is multiplied by the velocity of light and radio waves (approximately 186,000 miles per second) to determine two-way range, or halved to find one-way range.

The invention applies to cellular telephone systems that communicate using digital modulation, such as Code Division Multiple Access communications. In this signaling method, digitally coded information modulates a repetitive pseudo noise (PN) pulse train whose transitions ("chips") occur at a much faster rate than the digital information, the result being that the bandwidth required is "spread" to be much broader than the original data bandwidth. Many transmission channels can be defined within the same frequency band, if for each the transmitter uses a distinct PN pulse sequence, and if the different sequences all exhibit low correlation with one another for every time difference between the sequences. Correlation contributes to mutual interference between CDMA transmitters that operate concurrently within the same frequency band and (antenna coverage) cell.

To receive and convert information-containing pulsed signals from a CDMA transmitter, a CDMA receiver must know the precise PN sequence and Walsh codes used by the transmitter and must synchronize itself to the received sequence such that it creates an identical sequence, delayed in time by the transmission delay. The receiver combines its locally created sequence with the received signal (for example, by exclusive-OR followed by logical inversion), to extract data from the received signal. Through this "de-spreading", as is well known, the desired signal is enhanced, while noise and non-correlated pulsed signals are attenuated. The Multiple Access feature of CDMA implies that each channel (as defined by frequency band, cell and PN code sequence) can be shared by Mobile Stations through assignment of a series of "time slots" by the Base Station. It is, accordingly, also a Time Division multiplexing scheme.

This invention makes use of the pulse and timing signals normally present in digital cellular Mobile Stations using Code Division Multiple Access (CDMA) signaling techniques. Once it has completed the Acquisition sequence, the Mobile station (MS) maintains its transmissions in accurate synchronism with the signals intended for it and the other co-channel MS's it receives steadily from the BS. Therefore, the BS can determine, from the relationship between its own timing and that of the received signals from a MS, the two-way transit time of the radio signals, and from it the "radio range". This range measurement may be greater than, but not less than the physical range, if for example the signal energy traveled by a non-straight path between the two stations. Since the Base Station emits signal bursts almost continuously, and an actively communicating Mobile Station transmits a signal burst every few milliseconds, many range measurements are possible each second. Because timing is tracked in the Base Station, range is available at any time. Because there is noise in the communications, there are corresponding variations in the measured range. These can be integrated (filtered) out by well known methods. At an effective signal to noise ratio of 10 db per Walsh Symbol (whose duration is 200 microseconds), integration time of 2 milliseconds will yield a calculated one-way range accuracy of approximately 50 feet, or at 200 millisecond integration time, range accuracy of about 5 feet.

Range measurement is enabled without modification of the sending or mobile station equipment because of the synchronization between received epochs and transmitted ones that are required for normal operation in digital telephony. The range measurement is made from a base station currently in contact with the mobile station by measuring the time interval from the start of its own transmitted pulse epoch to the start of a pulse epoch subsequently received from the mobile station.

The above and other objects, advantages and features of the invention will become more apparent when considered with the following specification and accompanying drawings wherein:

FIG. 1 is a schematic illustration of a mechanically agile direction finding antenna system, FIG. 2 is a schematic illustration of a sequentially sampled electronically agile direction finding antenna system, FIG. 3 illustrates signals received by the agile direction finding antennas, FIGS. 4, 5 and 6 are block diagrams illustrating, respectively, amplitude frequency and phase sensing in the direction finding agile antenna of this invention, FIG. 7 is another embodiment illustrating frequency sensing in the direction finding agile antennas of this invention, FIG. 8 illustrates another embodiment of the phase sensing in the direction finding agile antennas of this invention, FIG. 9 illustrates the electronically sampled agile direction finding antenna, FIG. 10 is a plot showing the phase different between the sampled antenna array and the reference channel, FIG. 11 shows the direction finding system functional block diagram using a sampled antenna array incorporating the invention, FIG. 12 shows a functional block diagram of a transmission type agile antenna direction finding system, FIG. 13 diagrammatically illustrates the single site position determination using direction finding and ranging, FIG. 14 illustrates a position determination coverage plan, FIG. 15 illustrates the two-way ranging approach using CDMA signals, and FIG. 16 illustrates the cell site functional block diagram for single site position determination.

DETAILED DESCRIPTION OF THE INVENTION

Figure 1:
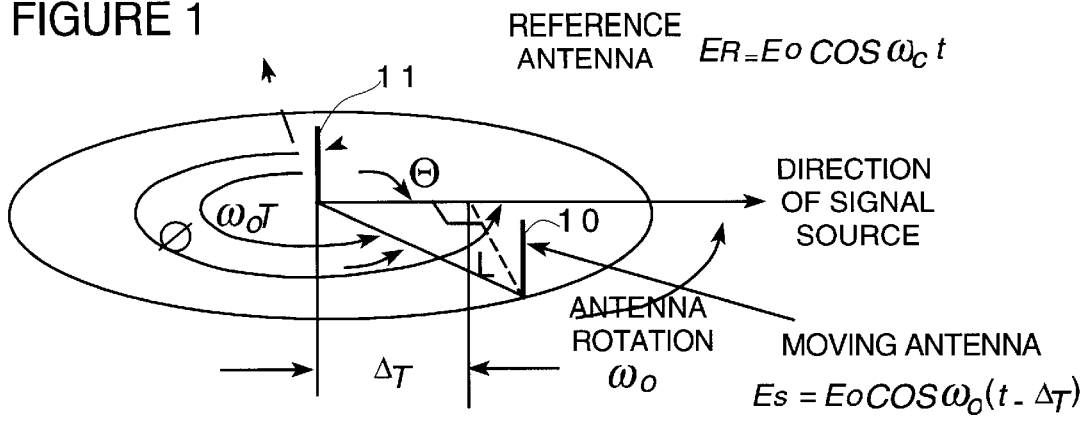
Figure 2:
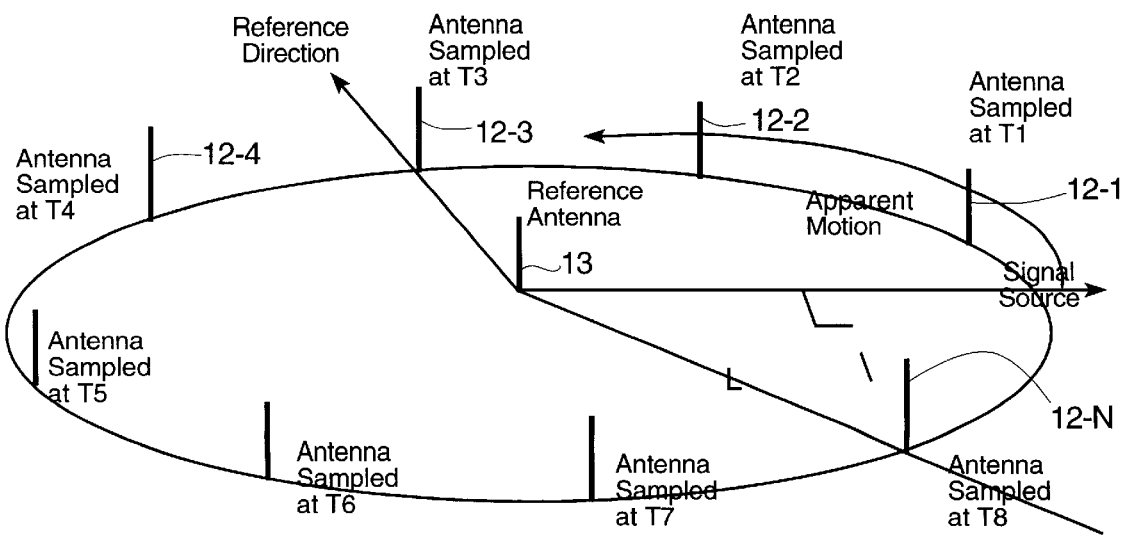

This invention incorporates an antenna system that determines azimuth (bearing) with a high degree of precision. The antenna system can be implemented in at least two forms, the first (TYPE I) being a mechanically moved (rotated) radio frequency phase sensing element 10 moving about a fixed receiving element 11 (see FIG. 1), and the second (TYPE II) being a sampled phased array of antennas 12-1, 12-2, 12-3 . . . 12-N spaced around the reference antenna (see FIG. 2) and being sequentially sampled at a rate equivalent to a mechanically rotating antenna's rotational period. Each antenna type utilizes a receiving system tailored to the detection system employed. A third variation of the antenna direction finding system is also disclosed wherein the DF antenna is incorporated into the transmission end of the system (Type III). The following sections will first describe the receiving DF systems starting with the mechanical (TYPE I) antenna system, and progressing to the Type II receiving DF system which will be described emphasizing the similarities and differences to the TYPE I antenna system. Following these descriptions, the Type III agile antenna DF system will be discussed.

TYPE I AGILE ANTENNA DIRECTION FINDING SYSTEM DESCRIPTION

Figure 6:
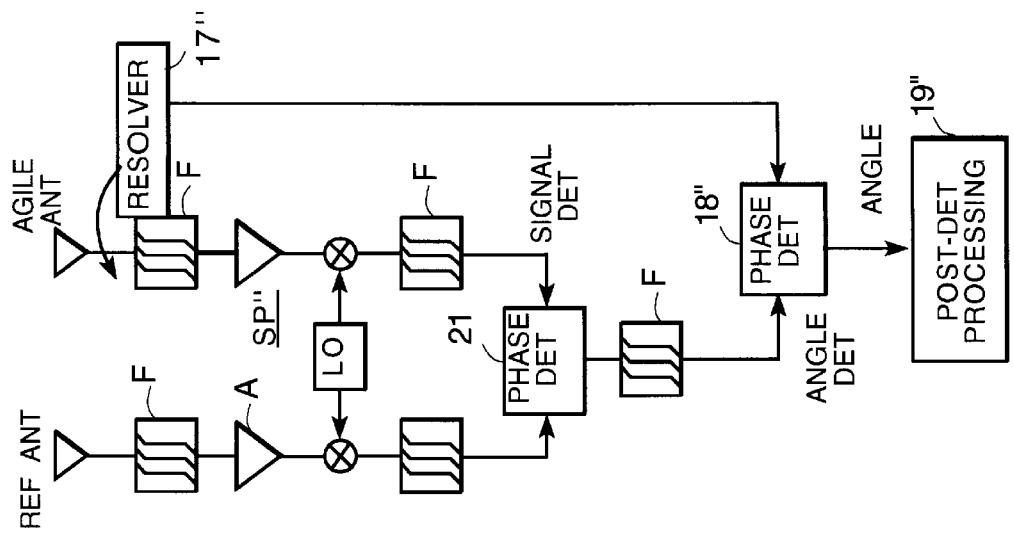
Figure 5:
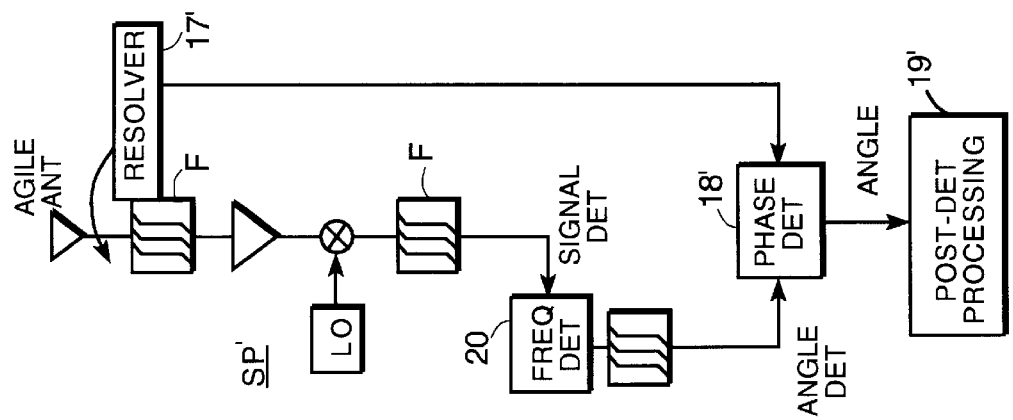
Figure 4:
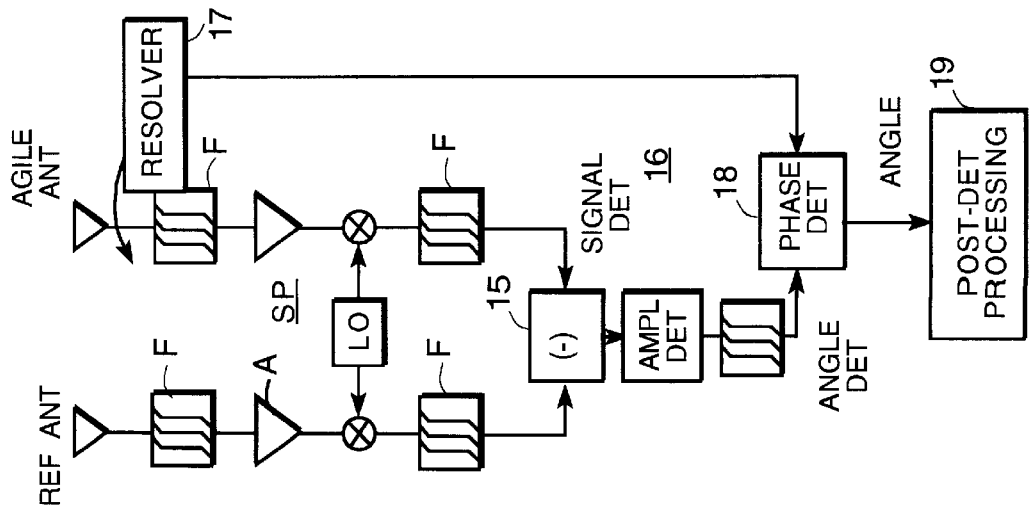

TYPE I antennas can utilize an amplitude sensing, frequency sensing (Doppler sensing), or phase sensing detection system. Amplitude sensing and phase sensing direction finding detection requires the use of the reference (stationary) antenna as an amplitude or phase reference for the agile antenna. Frequency detection does not require the use of the reference antenna although significant benefit can be achieved if the reference signal is used. FIG. 3 shows the basic antenna system and the equations governing the reaction of the antenna to an incoming radio wave signal. Equations (1) and (2) describe the signal received by the reference and agile antenna respectively. The reference antenna receives the incoming radio frequency signal with phase reference arbitrarily taken to be zero. The agile antenna receives the radio frequency signal with a time varying phase difference from the reference antenna that is a function of 1) the distance L (the radial separation between the reference antenna and agile antenna) and 2) the angular position of the agile antenna relative to the wave front (or direction of the incoming signal). Since the direction of the signal affects the phase of the signal received by the agile antenna, the direction of the signal is "transferred" to the agile antenna, and can be used to determine the signal source's direction as long as the position of the agile antenna is known relative to some arbitrary direction (such as North). The FIGS. 4, 5, and 6 show a typical receiving system employed by the antenna system to sense direction from amplitude sensing, frequency sensing, and phase sensing respectively. The equations used governing the direction sensing process are as follows:

A. $E_a = K_a[1+k^2+2k^*\cos(L2Pi/\lambda\{\cos(2PiF_o t)-1\})]^{1/2}$

B. $E_f = K_f(L2PiF_o/\lambda)\sin(2PiF_o t)$

C. $E_p = K_p(L2Pi/\lambda)\cos(2PiF_o t)$ where

L=antenna spacing $F_o$=antenna frequency.

In FIG. 4, which shows the amplitude sensing approach, the reference and agile antenna signals are compared in amplitude in comparator 15 at the Signal Detector 16. Since the antenna system is located a large distance from the signal source when compared to the distance L, the signal strength at the two antennas will on average be the same. However because of the time varying phase difference induced by the agile antenna's rotational speed $W_0$, the signals will periodically add and subtract, the subtraction producing a distinguishable null whose depth is dependent on the amplitude match of the two total paths and the Signal-to-Noise Ratio. The location of the null in time and with respect to the agile antenna's position, provided by resolver 17, is directly related to the direction of the incoming radio frequency signal so that the output of phase detector 18 is the angle supplied to adjust the detector processing unit 19.

In FIG. 5, which shows the frequency sensing approach, the reference signal is not necessarily required since the agile antenna induces a time varying phase term that can be detected by a frequency detector 20 (Signal Detector) (such as a frequency discriminator) without the aid of the reference signal. Frequency is related to phase by the following equation:

$f=(1/2\pi)d\theta/dt$

Because the time varying phase difference induced by the agile antenna's rotational speed $W_0$ produces a frequency varying signal which is related in phase to the incoming signal, the Signal Detector's output will be a sinusoid whose phase is determined by the incoming signal's direction. Therefore, if the Signal Detector's output is subsequently compared in a phase detector 18' to a sinusoid derived from the antenna's position (hereafter referred to as the Resolver Signal), the direction of the incoming signal can be determined from the signal output by the Angle Resolver Phase Detector 18'.

In FIG. 6, which shows the phase sensing approach, the phases of the reference signal and agile antenna's signal are compared in a phase detection Signal Detector 21. Because the time varying phase difference induced by the agile antenna's rotational speed $W_0$ is a function of the incoming signal's direction, the output of the phase detector will be a time varying signal of frequency $W_0$ and who's phase relative to the antenna position is determined by the incoming signal. Therefore, this output signal or the Signal Detector 21 is further compared to the phase of the Resolver 17" Signal in the Angle Resolver Phase Detector 18" and the direction of the incoming signal can be determined from the output of this phase detector.

The signals used by these various detection processes require that the signal in the comparison paths (for amplitude and phase detection processes) be the same (that is, have the same modulation information) in order to sense the signal differences. For amplitude sensing and phase sensing therefore, the total modulation spectrum of the signal must be received by both paths, and the differential time delay between the two paths must be small compared to 1/bandwidth of the modulation signal. In this manner, not only the modulation products cancel, but undesirable modulation products such as local oscillator noise also cancels as does any frequency error in the incoming signal. Similarly, for frequency detection, all of the modulation products must be present at the frequency detector to prevent demodulation distortion. For these approaches, the system bandwidth must remain as wide as the modulation information until the signals are compared at the Signal Detector. The bandwidth following the Signal Detector (and before the Angle Resolver Phase Detector) may be of significantly smaller to achieve a high processed Signal-to-Noise Ratio (SNR).

The following describes a detection process that also makes use of the modulation cancellation properties of the comparison approach, but permits narrowing the bandwidth before the Signal Detector.

Figure 7:
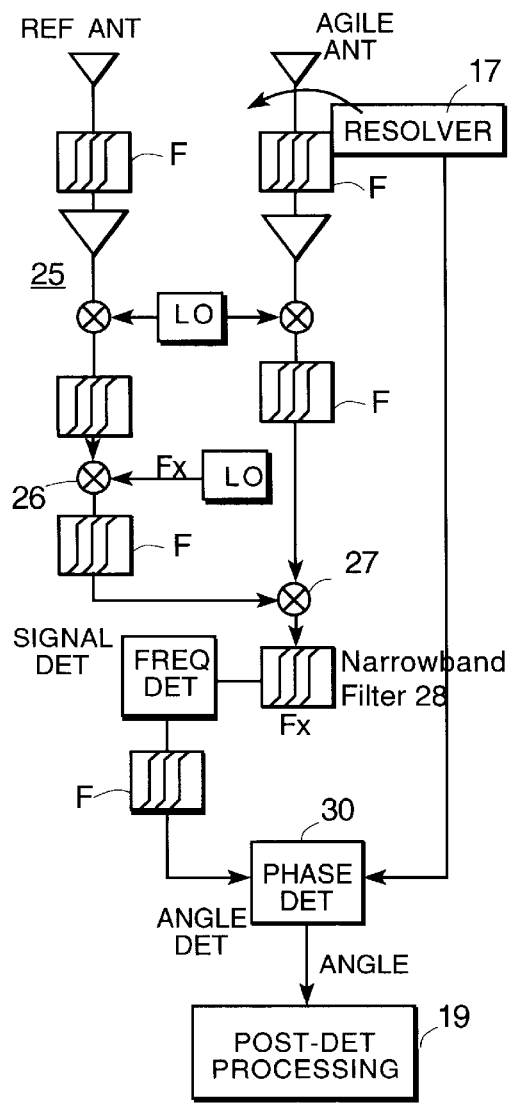
Figure 8:
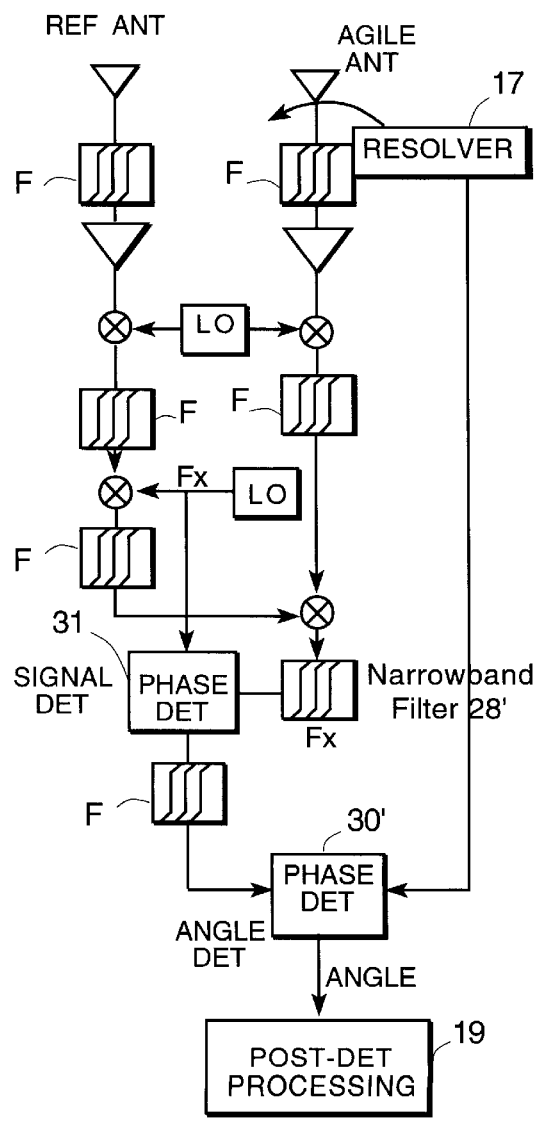

FIGS. 7 and 8 show a predetection modulation cancellation scheme that precedes the Signal Detector for frequency and phase detection agile antenna direction finding systems. In FIG. 7, the signals are received by the reference antenna's receiver and the agile antenna's receiver as wideband pre-detection signals. One of the paths (in the case shown, the reference path 25), is mixed 26 to a different frequency by a local oscillator $F_x$. The resulting output is in turn mixed 27 with the agile antenna's signal, producing a narrowband signal at $F_x$ containing only a carrier phase (or frequency) modulated by the phase difference between the reference antennas signal and the agile antenna's signal. The output of the mixer 27 has the characteristics of modulation cancellation as long as the time delays between the two signal paths from the antenna to the mixer are equal (or small compared to 1/bandwidth of the incoming signal). Additionally, local oscillator noise induced on the incoming signal is also canceled as is an frequency error. This narrowband signal can now be filtered 28 to a bandwidth of $4L\pi F_o/\lambda$, providing a substantially smaller angle processing predetection filtering bandwidth. In FIG. 7, the narrowband signal is fed to a frequency sensing Signal Detector, and the Signal Detector's output sent to the Angle Resolver Phase Detector 30.

In FIG. 8, the same predetection processes are used to produce a narrowband carrier modulated only by the phase angle difference between the two antennas. Since the output frequency of the carrier is $F_x$, this signal can be phase compared to the high quality local oscillator signal $F_x$ in the phase sensing Signal Detector 31, and that detector's output filtered and sent to the Angle Resolver Phase Detector 30'.

The processes shown above have been described with a mechanically moving agile antenna. In the following sections, processes applicable to the concept using a sampled antenna array will be given.

TYPE II AGILE ANTENNA DIRECTION FINDING SYSTEM

Figure 9:
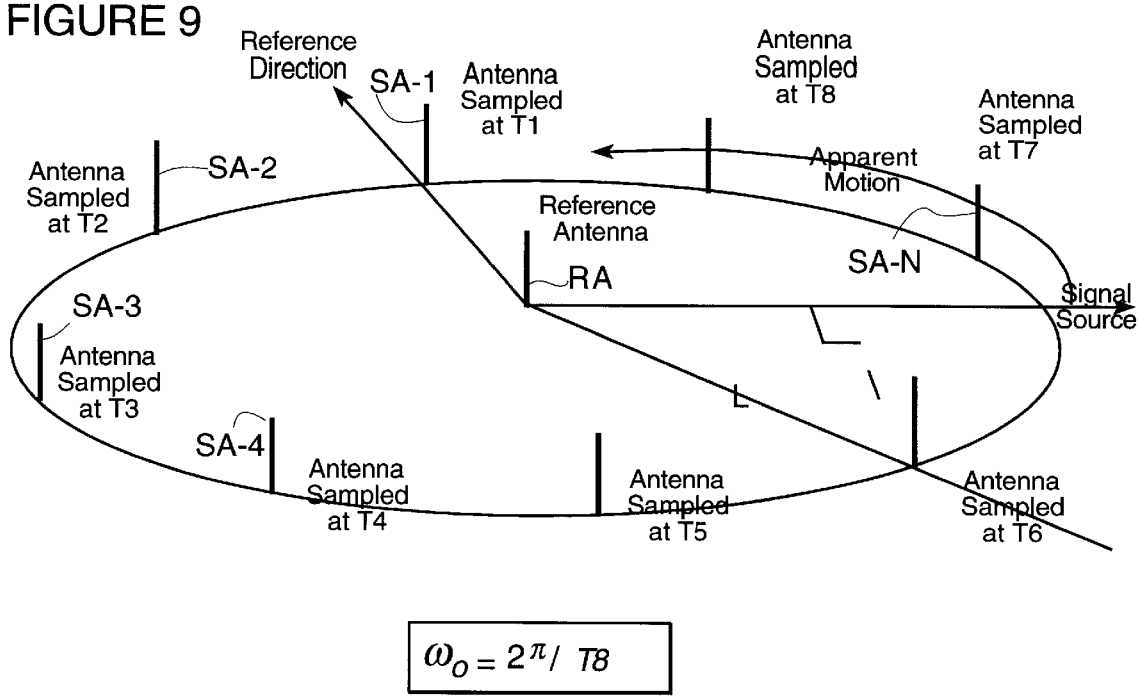

FIG. 9 shows an antenna system that replaces mechanical motion with sampled or scanned antenna elements SA1, SA2, SA3 . . . SAN that are connected to the non-reference channel receiver one at a time. These sampled or scanned antenna elements are usually sampled sequentially, however, sequential connections are not mandatory, (and as will be shown, it is only essential that they are periodically sampled permitting multi-dimensional arrays that can determine multiple angles such as azimuth and elevation). In FIG. 9, the reference antenna RA is continuously connected while one antenna is connected to the non-reference channel receiver at time T1. This antenna is disconnected at time T2 and a neighboring antenna is connected. In turn, this antenna is disconnected at T3, and its neighbor is connected, etc. In the eight element sampled array shown, the equivalent antenna rotation speed (to the mechanical equivalent) is 1/T8.

Figure 10:
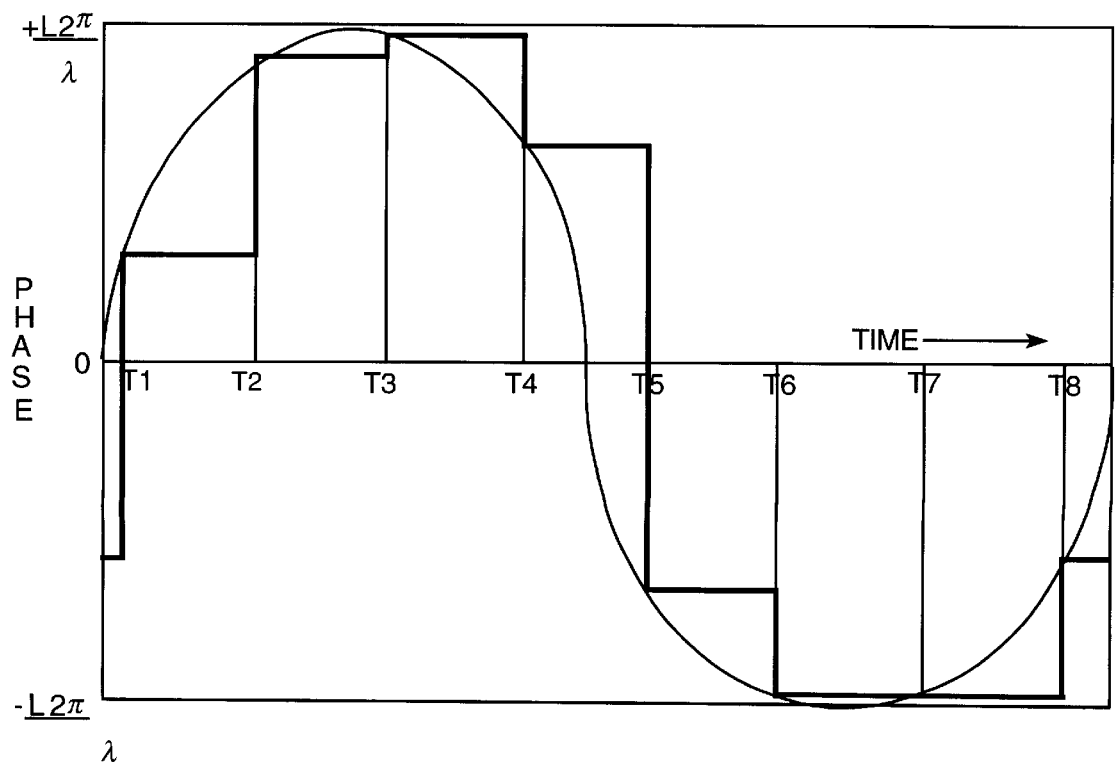

FIG. 10 shows the phase relationship of the sampled antenna to the reference channel signal. During the time that a sampled antenna is connected to the "sampling" channel, the phase difference between the sampled channel and the reference channel remains constant. Since there is no physical motion of the sampled antenna, no Doppler component exists for that period. As each antenna is sequentially connected, a new but different phase difference is experienced, with the maximum phase amplitude difference being $L2\pi/\lambda$. Because of the circular geometry of the depicted antenna, the phase difference, when properly filtered, will produce a sinusoid whose period matches the time to completely sample all the antennas. The sinusoid can be reproduced precisely as long as the number of elements of the array exceed the Nyguist criteria for sampled data systems. The sinusoid will have a phase offset that will be constant, and must be accounted for in the direction finding equations.

Figure 11:
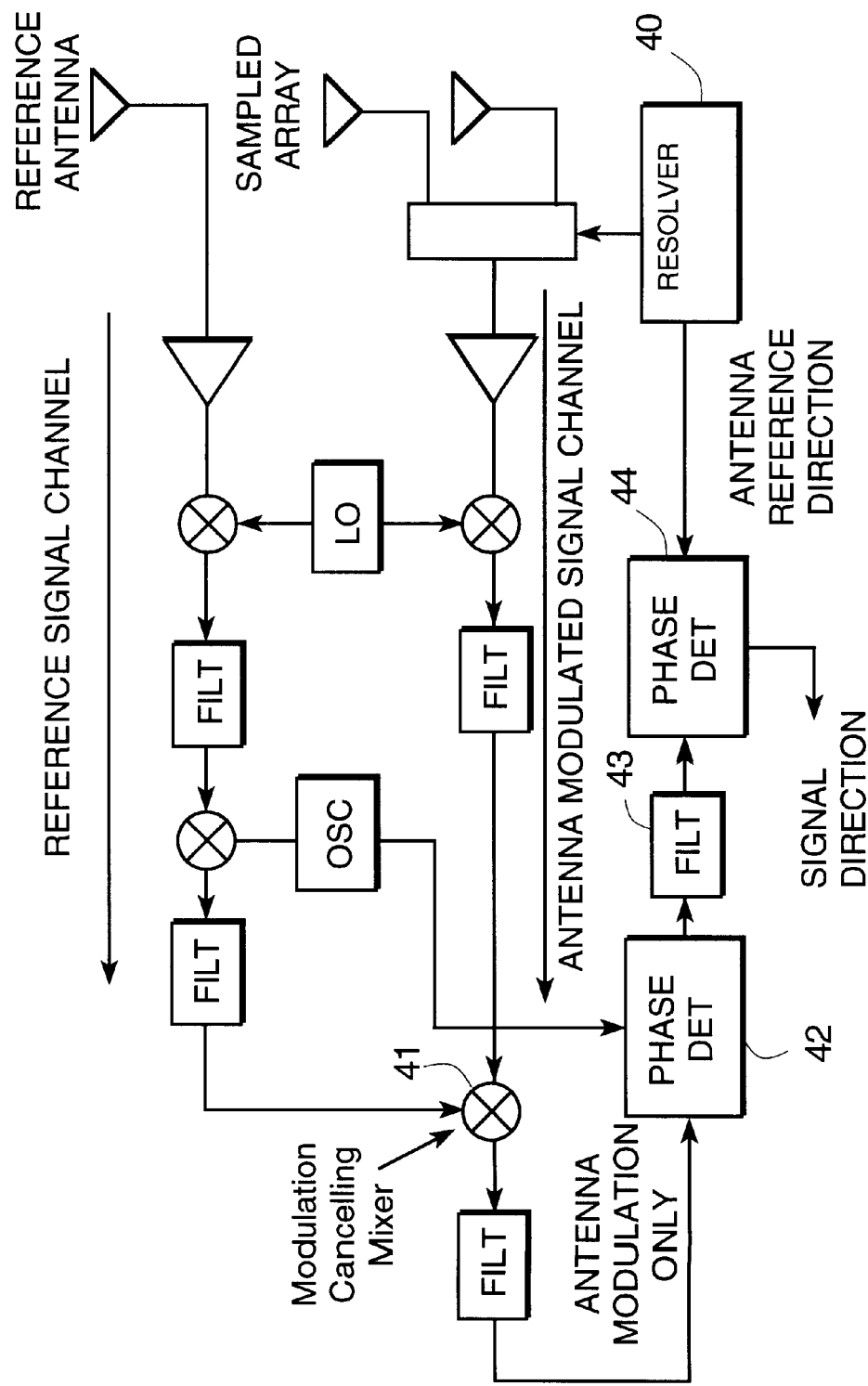

FIG. 11 shows a functional block diagram of a direction finding receiving system using the sampled array agile antenna. The Antenna Resolver 40 for this diagram periodically closes each antenna switch in the electronically agile array. The resolver also generates a reference signal periodic in 1/NTs where N is the number of elements and Ts is the sample interval between individual samples. The expression 1/NTs corresponds to Fo in the mechanically agile antenna system. The particular diagram shown uses a modulation canceling mixer 41 to develop a narrowband carrier signal of bandwidth $2(L2\pi F_0/\lambda$. This signal is subsequently demodulated by a multi-radian phase detector 42 to derive the baseband phase samples. These samples are filtered 43 and processed to derive the absolute phase when compared in phase detector 44 to the antenna reference direction generated by the resolver 40. It should be noted that there is a significant difference between the sampled array antenna and the mechanically driven approach in that the former system's antenna does not physically move, and is stationary even during the period that the antenna is active. Because there is no movement, there is no Doppler component, and therefore, frequency detection approaches are not applicable.

TYPE III AGILE ANTENNA DIRECTION FINDING SYSTEM

Both the Type I and Type II agile antenna direction finding systems described thus far have employed the agile antenna at the receiving site. It is however possible to employ the agile antenna system at a transmission site that can aid the receiving site in determining its azimuth to the transmission site, and accomplish this task with a simpler receiving antenna than the agile antenna system. This is especially useful when the receive site needs to do the determination process without a spatial antenna array (such as a portable cellular telephone user).

There are a number of similarities between the Type I and Type II antenna systems. These similarities are:

1. There must be a reference channel to use as a RF phase reference channel,
2. There must be an "agile" antenna channel signal that conveys the RF phase difference, and
3. There must be a direction reference channel (the resolver channel) that allows the array to be physically aligned to a reference direction (North as an example).

Figure 12:
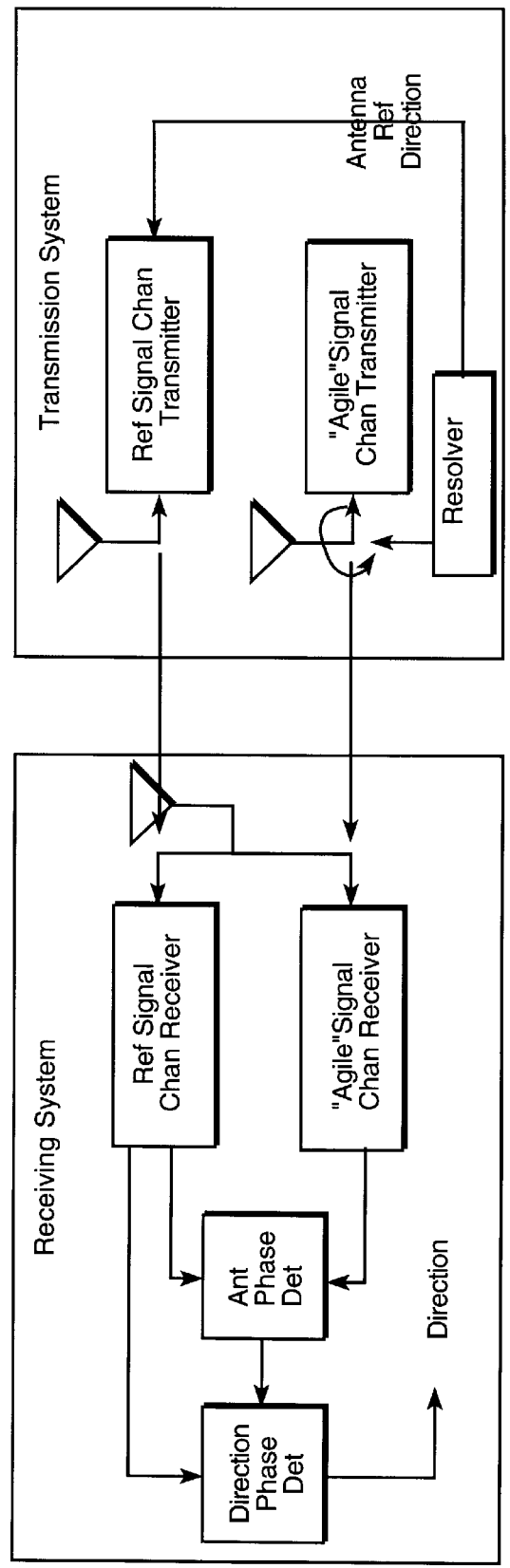

The Type III agile antenna system, shown in FIG. 12, provides these three channels from the transmit end of the system.

The transmission portion of the DF system consists of two channels of "RF" antenna information and a superposition of the reference antenna direction data on one of the channels. The two channels of "RF" antenna phase information can be generated in several ways, however the phasing information between the channels must be synchronous to achieve high accuracy. The two channels can (for example) be transmitted on two different (but synchronous) spread spectrum PN sequences, each of which can be separately demodulated as a separate channel by the receiving system. Similarly, the two channels can (for example) be transmitted as two different frequencies (frequency division) as long as the phase coherence is maintained between the channels. The important aspect of these two antenna channels is that the relative phase of one channel can be ascertained with respect to the other.

Finally, the transmitting antenna's reference direction needs to the transferred from the transmitting end of the system to the receiving end. This is accomplished by transmitting the Resolver's phase information over one of the two channels. Either RF channel can be the transmission media for the information, however the Reference antenna (RF) channel is the most convenient since the "agile" antenna's modulation will not interfere with the demodulation. (Similarly, the Reference Antenna (RF) channel is most convenient for the communication channel for the same reason, although, the agile antenna's frequency of "rotation" Fo is usually sufficiently low as to not significantly interfere with the demodulation process.)

ANGLE AND DIRECTION FINDING ACCURACY

The accuracy of the Agile Antenna Direction Finding System's Accuracy will be evaluated in terms of that achievable in an ideally phase detection system. Refer to FIG. 8 for the block diagram of the signal processing. The reference signal $E_r$ is given by:

$$E_r = E_o \cos\{W_c t + F(t)\}$$

The signal from the agile antenna $E_s$ is given by:

$$E_s = E_o \cos\{W_c t + F(t) - [2L(Pi)/\lambda]\cos[2(Pi)W_o t - \phi]\}$$

where:

Eo is the received signal amplitude
$W_c$ is the received signal carrier frequency
F(t) is the modulation on the incoming signal
L is the reference antenna to agile antenna spacing in the same terms as $\lambda$
$\lambda$ is the carrier frequency wavelength
Wo is the "angular" rotation velocity of the agile antenna
$\phi$ is the antenna reference direction provided by the resolver (and will be ignored in the following derivations since the resolver reference angle can be supplied to any arbitrary accuracy and does not affect the inherent accuracy).

The two signals are fed to a product detector to produce an intermediate signal stripped of the modulation. The output of the product detector Ed is:

$$Ed = E_{LO} \cos(W_{LO} t - [2L(Pi)/\lambda]\cos[2(Pi)W_o t]).$$

The Signal-to-Noise power ratio (SNR) from a phase detection system with the above modulated signal is $$SNR = (\phi)^2 C/(2FoNo)$$

where:

$\phi = 2(Pi)L/\lambda$
C is the carrier power
Fo is the agile antenna's rotation frequency
No is the received noise power density The ability to determine the precise phase of a signal in the presence of noise is given by the phase uncertainty function $\psi$ is:

$$\psi = (SNR)^{-\frac{1}{2}} = (^-/2PiL3[2FoNo/C]^{-\frac{1}{2}} \text{ (radians)}$$

This angular uncertainty can be converted to tangential distance uncertainty dD by:

$$dD = \psi x\ R$$

where R is the distance between the signal source and DF receiving system.

Figure 13:
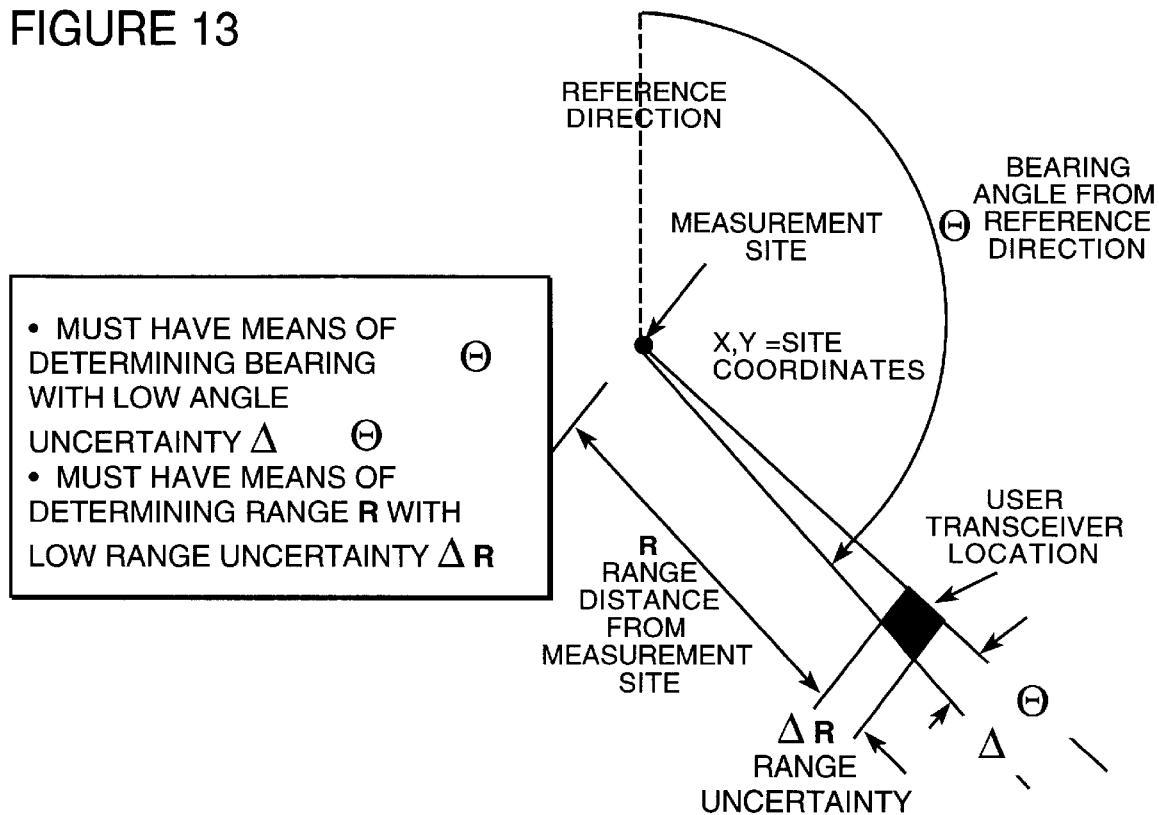

The present invention utilizes a combination of Direction Finding (discussed earlier) and two-way ranging as is shown in FIG. 13 so that only the cellular infrastructure is utilized to accomplish position determination. This minimizes cost impact on the user's set. Thus, the preferred embodiment of the invention basically uses a single cell site as the primary position location or determination, using a combination of 1) agile antenna direction finding (discussed above), and 2) two-way ranging.

The cell site conducts a two-way ranging operation to determine the distance the user set is from the site, and also conducts a DF measurement to determine the angle from the site's reference direction.

Figure 14:
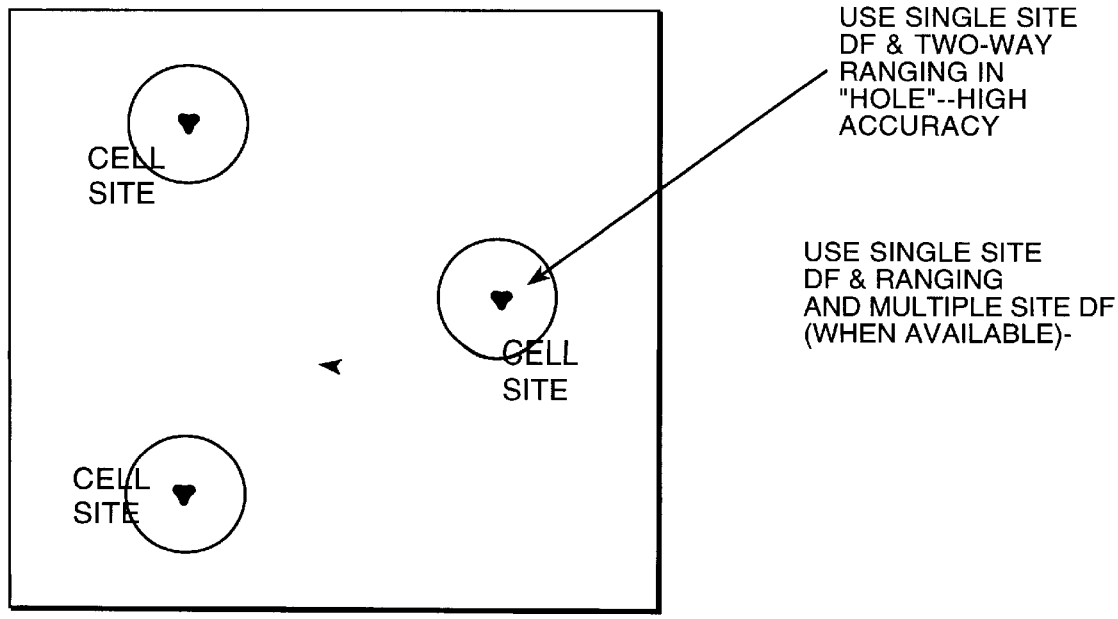

Within the uncertainties of the measurements, the user set is known within an area approximately $\Delta R \times R\Delta\theta$. Only one site needs to make this measurement, however if multiple sites can accomplish the DF process, the additional information can be utilized as refining and confirming data. The approach then for the system concept of operations is shown in FIG. 14, wherein only single site position determination is relied upon for the entire area coverage are, however, when multiple sites can participate in the DF process, their data is also used by the system.

Two-way ranging to determine the distance R can be accomplished in numerous ways including (to name a few);

1. using the "color" tone (approximately 6 KHz) of the AMPS system,
2. using the time slot delay for TDMA, and 3. using the outbound and inbound code synchronization for CDMA.

Figure 15:
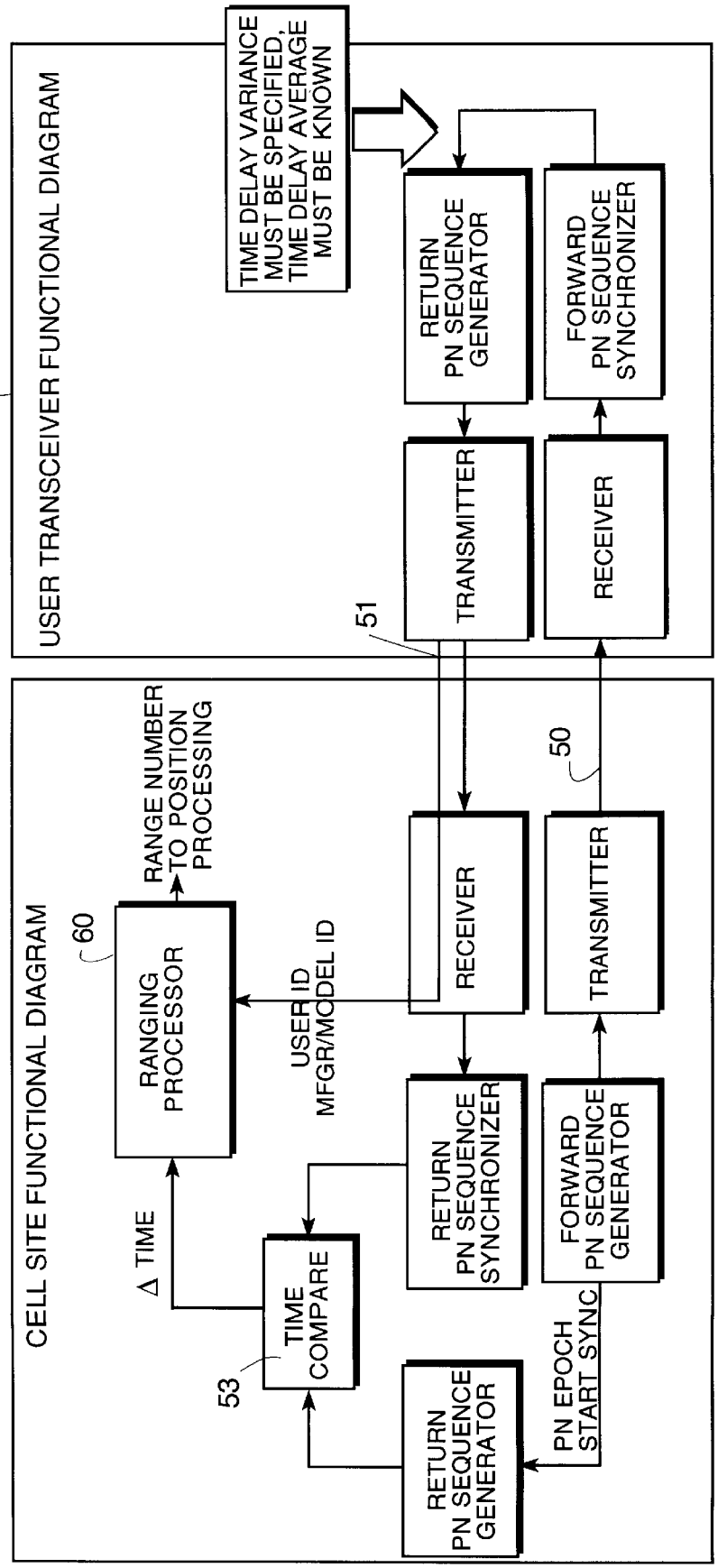

The following describe the CDMA approach. The principle of operation is shown in FIG. 15. CDMA uses an outbound spread spectrum code 50 and inbound spread spectrum code 51 unique for each user transceiver 52 connection at a given time. The outbound spread spectrum code 50 permits the user set 52 to lock-on and demodulate the cell site's transmissions. The return code 51 is synchronized to the inbound for a number of technical reasons of which at least one is reduced cell site acquisition time. Therefore there is a time relationship between the outbound sequence and the inbound sequence that can be used to estimate the round trip time (and therefore distance). This is accomplished by using an outbound code 50 epoch to synchronize a locally generated replica of the user set's inbound code. When the actual user set code is received by site, the code timing (phase) difference can be measured in 53. Since the user sets of differing manufacturers may have a different turnaround time average and variance, manufacturer's set measured performance characteristics are stored in the ranging processor 55 and functions to minimize the uncertainty of the ranging estimate. The appropriate manufacturer is determined from the CDMA ID used for call setup.

Each cell site is equipped with one or more Ranging and DF Processing systems dependent on the number of position location service calls are to be processed. Under normal speeds of user mobility, one system can be sequenced over a number of users in a matter of seconds (or less) minimizing the amount of movement achievable by the user set.

Figure 16:
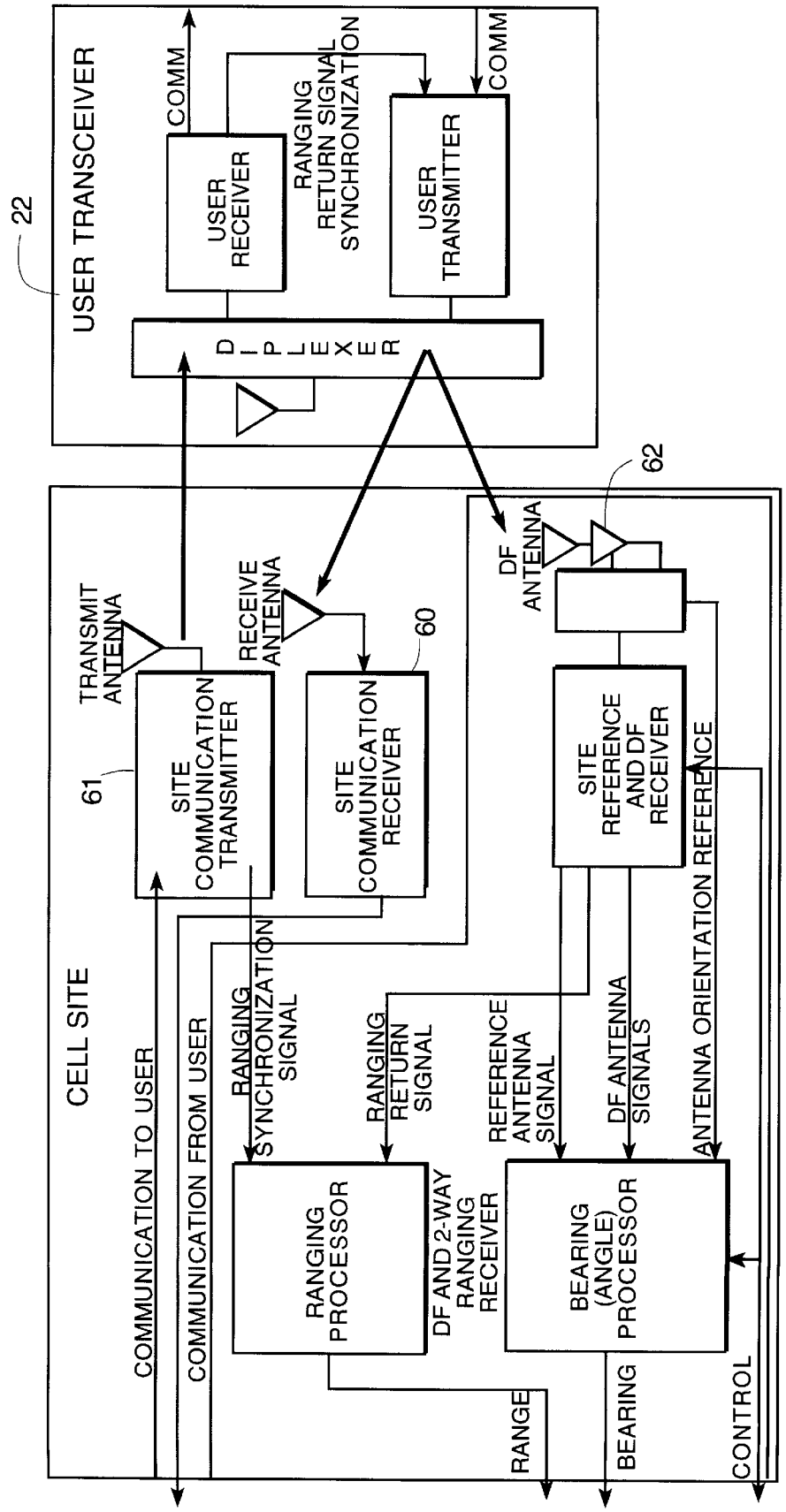

FIG. 16 is a functional block diagram of the cellular position determination system cell site (shown in relationship to the user set). The DF and ranging receiving functions can be combined in the site's equipment complex and be external to the communications equipment receiving 60 and transmitting 61 equipment. The DF antenna system 62 (reference antenna and "agile" antenna) can be used for the entire cell area even if the site is sectored to increase cell density. The primary requirement of the DF antenna system 62 is that the antenna system have good visibility (siting) relative to any structural elements and other antennas. Upon receiving a request for a position determination, the user outbound and inbound code data is conveyed to the DF and 2-way Ranging Receiving System to 1) begin the ranging operation, and 2) to collapse the inbound CDMA signal to conduct a DF on only the desired user (since many users share the same frequency band). Ranging and DF estimates are functionally produced by their respective processing and these data sent to the cellular switching central office (MTSO) (not shown). The MTSO maintains control over the user set, and manages the process of handing-off the user to neighboring cells (when appropriate) to maintain both communication and position determination functions.

The invention has numerous applications; these include:
1. Position location determination in cellular/personal communications systems applications requiring precise knowledge of the user location.
2. Position location determination in industrial applications requiring precision location (positioning) of tools and/or objects.

While the invention has been described in relation to preferred embodiments of the invention, it will be appreciated that other embodiments, adaptations and modifications of the invention will be apparent to those skilled in the art.

What is claimed is:

1. In a cellular telephone communication system having at least one base station and a plurality of remote mobile stations in which both base and mobile stations have RF transceivers which communicate with each other using periodically repeated pulse sequence epochs whose time patterns are known at both transmitting and receiving station, each mobile station transceiver, during normal operation, establishes and maintains synchronization between the start of a received pulse epoch at the mobile station and a subsequent beginning of a responsive transmitted pulse epoch, the improvement comprising:

an agile antenna system at said base station, said agile antenna system including at least one scanning antenna spaced a predetermined distance from a reference point, said at least one scanning antenna being effectively rotated relative to the central reference point and adapted to receive RF transmissions from a selected mobile station, and a direction detection processor connected to said at least one scanning antenna for detecting from received RF transmissions from said selected mobile station the bearing to said selected mobile station from said base station, and a range measuring processor at said base station for measuring the time interval from the start of said base station's transmitted pulse epoch to the start of a pulse epoch subsequently received from the selected mobile station and deriving range to said selected mobile station therefrom.

2. The cellular telephone communication system defined in claim 1 where in said direction detecting processor is one selected from amplitude sensing, frequency sensing and phase sensing.

3. In a cellular telephone communication system having at least one base station and a plurality of remote mobile stations in which both base and mobile stations have RF transceivers which communicate with each other using periodically repeated pulse sequence epochs whose time patterns are known at both transmitting and receiving station, each mobile station transceiver, during normal operation, establishes and maintains synchronization between the start of a received pulse epoch at the mobile station and a subsequent beginning of a responsive transmitted pulse epoch, the improvement comprising:

an agile antenna system at said base station, said agile antenna system including a central reference antenna and at least one scanning antenna spaced a predetermined distance from said reference antenna, said at least one scanning antenna being effectively rotated relative to said reference antenna, and a receiving system, including a bearing detection processor connected to said antennas for detecting the bearing to a selected mobile station from said base station, and a range measuring processor at said base station for measuring the time interval from the start of said base station's transmitted pulse epoch to the start of a pulse epoch subsequently received from the selected mobile station and deriving range to said selected mobile station therefrom.

4. The cellular telephone communication system defined in claim 2 where in said bearing sensing processor is one selected from amplitude sensing, frequency sensing and phase sensing.

5. A position location system for an RF communication system in which at least one base station has a communication receiver with a reference antenna for use with mobile stations, each mobile station having an RF transceiver for communicating with said base station using repeated pulse sequence epochs whose time patterns are known at both transmitting and receiving station, each mobile station transceiver, during normal operation, being equipped to establish and maintain synchronization between the start of a received epoch at the mobile station and a subsequent beginning of a reference to a responsive transmitted pulse epoch, an agile antenna system at said base station including at least one scanning antenna spaced a predetermined distance from said reference antenna, said at least one scanning antenna being effectively rotated relative to the central reference antenna and adapted to receive RF transmissions from at least one selected mobile station, and a bearing sensing processor connected to the at least one scanning antenna for detecting from received RF transmissions from the selected mobile station the bearing to the selected mobile station from said base station, and > a range measuring processor at said base station for measuring the time interval between the start of said base station's transmitted pulse epoch to the start of a pulse epoch subsequently received from the selected mobile station and deriving range to said selected mobile station therefrom.

6. The system defined in claim 5 wherein said bearing sensing processor is selected from amplitude sensing, frequency sensing, and phase sensing.

7. In an RF communication system having a central reference antenna and an array of antenna positions around the reference antenna for receiving digital telephony radio signals from a plurality of mobile sources, detecting the relative phases of the radio signals received at said reference antenna and each of said antenna positions in said circular array, and deriving therefrom the direction to each said mobile source relative to said reference antenna.

* * * * *